W. T. Anderson.
Book Cover.
No. 2089. Fig. 1. Reissued Oct. 17. 1865.
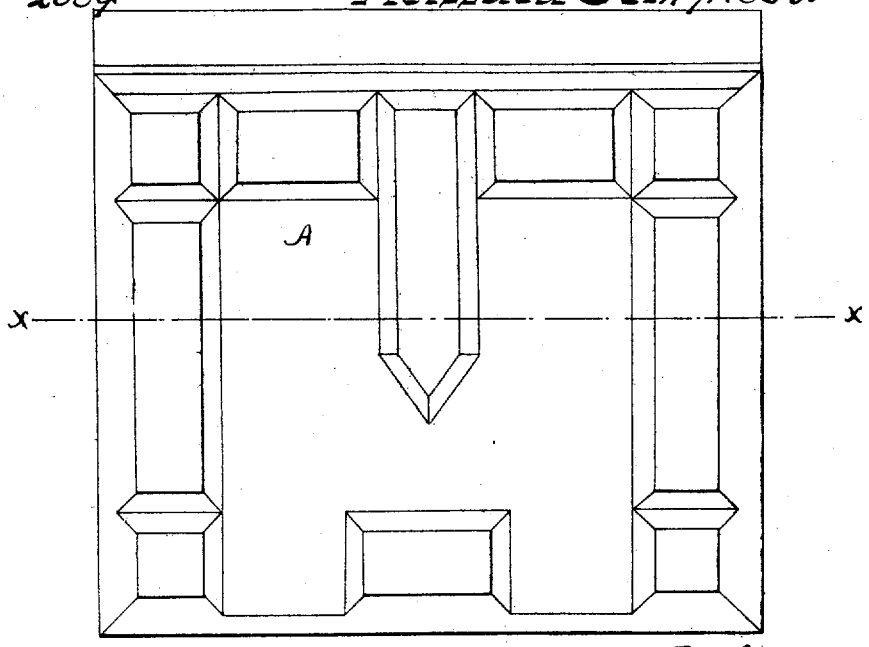
Fig. 2.
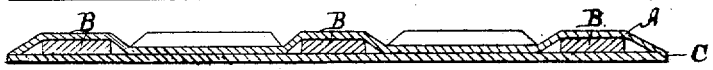
Fig. 3.
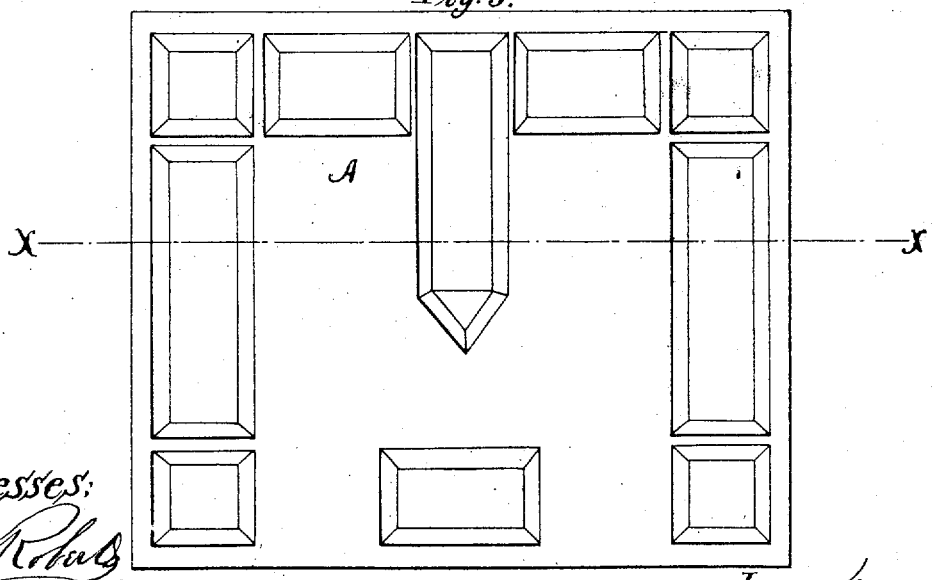
Witnesses:
L. A. Robb
Chas. E. Hoag.
Inventor:
W. T. Anderson.

UNITED STATES PATENT OFFICE.

WILLIAM T. ANDERSON AND HEZEKIAH S. ARCHER, OF BROOKLYN, NEW YORK, ASSIGNEES OF WM. T. ANDERSON.

IMPROVEMENT IN EMBOSSED COVERS FOR BOOKS.

Specification forming part of Letters Patent No. 43,450, dated July 5, 1864; Reissue No. 2,089, dated October 17, 1865.

*To all whom it may concern:*

Be it known that I, WILLIAM T. ANDERSON, of Brooklyn, in the county of Kings and State of New York, have invented a certain Improvement in Covers for Books and Articles of Like Nature; and I do hereby declare that the following is a full, clear, and exact description thereof, reference being had to the accompanying drawings and to the letters of reference marked thereon.

My invention relates to that class of covers for books, albums, &c., in which the cover is made with raised portions, generally for the purpose of ornament chiefly, though such portions add incidentally to the strength of the cover. These raised portions have been formed by various devices, and among other plans for their formation bits of wood have been cut out of the right size and shape to form the projection and laid upon the junk-board, which forms the principal foundation of the cover. This mode of construction is objectionable, both on account of the labor and expense involved and also on account of the want of uniformity which necessarily results from putting on these pieces by hand, and which makes it necessary to finish the cover after the leather is on by hand, and prevents the use of a die to press the ornament onto the leather.

My invention consists in, first, making the book-cover or the foundation therefor by first striking up a piece of junk-board or binders' board into the proper form, or into the form desired, and then filling the inside of the raised portions with pieces of junk-board or other appropriate material; and second, combining with the struck up junk-board above mentioned a plain inner board in the construction of a book-cover, substantially as set forth.

In the drawings, Figure 1 is an outside view of one-half of the book-cover complete. Fig. 2 is a section taken through the line *x x*, Figs. 1 and 3. Fig. 3 is an inside view of the struck-up foundation-piece with the raised portions filled on the inside.

In Figs. 2 and 3 the outside leather or cloth covering is not represented, it being unnecessary to a full representation of the invention, as the leather is applied in the same manner as to other covers.

A is the principal foundation-piece. I form this by placing a piece of junk-board in a die having the design cast or formed therein, with the necessary matrix to correspond, and supply sufficient pressure to bring up the junk-board properly to fill the die and to so compress it as to cause it to retain its position. This being done, I cut small pieces B of junk-board, or any other suitable material, into the proper shape to fill or nearly fill into the inside of the portions struck up to form the raised portions of the cover. Very little care is required to cut these pieces or to put them into place. The latter can be done by children. These pieces may be glued into place or pasted, or may be secured by putting on the piece C upon the inside, which may be done by glueing or pasting, or in any other manner in which it is customary to do that kind of work. As already intimated, no great pains is necessary in the formation of these pieces B. They are not beveled to fit the bevel in the corner, nor is it necessary that they should fit closely into the places they are to occupy. It is obvious, therefore, that very little labor is necessary for their construction, as they may be cut in the cutting-press, and very little expense is involved in them, as they may be made of waste scraps of junk-board, or in fact of almost anything that comes to hand and is available for the purpose. The leather or cloth which forms the outside covering can be put on in the usual manner, and if ornaments thereon are desired they can be made or put on by a die suitable for the purpose, as the foundation-board A, being formed in a die, insures uniformity and exactness in the form of each of the raised portions and its position relatively to the other parts. This construction is exceedingly well adapted to the manufacture of covers for albums and other articles of like nature and the more costly kinds of books. It insures cheapness in the manufacture, and at the same time accuracy of design.

The most satisfactory result is secured by combining all three of the parts A, B, and C in the construction of a book-cover in the manner described; but where cheapness is more desirable than superior quality, a book-cover that will answer the purpose tolerably well may be made by combining the parts A and B, or by combining the parts A and C.

Having thus fully described my said invention, I claim—

1. A book-cover made by striking up a foundation of junk-board or other material to form the foundation of the cover, and filling in the raised portions on the inner side by blocks of any suitable material, substantially as and for the purpose set forth.

2. Combining with the board, A, struck up as described, the inner board, C, substantially as and for the purpose set forth.

WM. T. ANDERSON.
HEZEKIAH S. ARCHER.

Witnesses:
THOS. P. HOW,
JAMES T. GRAHAM.